May 27, 1958 C. B. FORREST ET AL 2,836,356

ANALOG-TO-DIGITAL CONVERTER

Filed Feb. 21, 1952 2 Sheets-Sheet 1

INVENTORS,
CAMERON B. FORREST,
BY SIDNEY S. GREEN,
Seymour M. Rosenberg
ATTORNEY.

ANALOG-TO-DIGITAL CONVERTER

Filed Feb. 21, 1952 2 Sheets-Sheet 2

INVENTORS,
CAMERON B. FORREST,
SIDNEY S. GREEN,
BY
Seymour M. Rosenberg
ATTORNEY.

United States Patent Office 2,836,356
Patented May 27, 1958

2,836,356

ANALOG-TO-DIGITAL CONVERTER

Cameron B. Forrest and Sidney S. Green, Los Angeles, Calif., assignors, by mesne assignments, to Hughes Aircraft Company, a corporation of Delaware Application February 21, 1952, Serial No. 272,784

7 Claims. (Cl. 235—61)

The present invention relates to an analog-to-digital converter and more particularly to an analog-to-digital converter of the electronic type in which the digital information is continuously available at very short access times.

An analog-to-digital converter is a device which accepts instantaneous values of variable quantities and expresses these values in discrete numerical form. In general, an electrical converter of this type periodically samples the instantaneous amplitude of an electrical analog signal and expresses the amplitude of the sample in the form of a digital count.

In one electrical converter of the prior art, a sample of the voltage representing the data to be converted is first introduced into a sampling pulse-width modulator which measures the amplitude of the voltage sample, with respect to a reference bias voltage, and gates out a pulse having a width proportional to the measured amplitude. This gate pulse controls a gate which is coupled between a clock pulse source and a pulse counter, the control being in such manner that the number of clock pulses passed to the counter is substantially proportional to the width of the gate pulse. The clock pulse rate is determined by the maximum number of digits to be represented. For example, if the analog data are to be represented by four binary digits, the clock pulse rate is set so that the maximum width of the gate pulse is equal to 16 times the period of the clock pulses. Such a converter may be termed a "counting" converter.

It is apparent that this converter of the prior art has a relatively long access time, that is the time between the application of the analog signal and the reading of the digital count. In other words, in this converter, the count cannot be read until the end of the time interval of the last possible pulse to be counted. For example, if the digital count is to be represented by four binary digits, a reading is not available until the expiration of 16 clock pulse intervals, even though the amplitude sample has any value from 0 to 15. In addition, if the number of binary digits is increased by one in order to double the accuracy of the reading, and if the clock pulse rate remains the same, the access time is doubled and the upper frequency limit is halved. Furthermore, since the sampling rate can be only a fraction of the clock pulse rate, readings are not continuous and the upper frequency limit is relatively low.

In order to increase the upper frequency limit and decrease the access time, a second type of electrical converter has been proposed in the prior art. In this second converter, the amplitude of the analog sample is compared with a standard voltage representing the magnitude of the highest order digit to be represented. If the standard voltage is smaller than the sample, it is subtracted from the sample and the remainder is then compared with a voltage representing the next highest order digit. This process is continued until the lowest order, or unit digit is compared with the remainder of the sample and is determined to be either larger or smaller. This type of converter may be termed a "subtraction" converter.

Although the substraction converter has a higher frequency limit and a shorter access time than the counting converter, readings with the subtraction converter are not continuous. For example, in a four binary digit subtraction converter, the reading is not available until the expiration of four digit intervals. In addition, a highly accurate subtraction circuit is required in order to quantitatively produce a signal representative of the remainder after each subtraction. Furthermore, as the number of binary digits to be represented is increased by one in order to double the accuracy of the reading, the access time is increased by one digit interval. It is, therefore, seen that in both prior art converters, the upper frequency limit is determined by both the clock pulse rate and the accuracy desired.

The present invention discloses an electronic analog-to-digital converter which overcomes the above and other disadvantages of the prior art converters. According to the basic principle of the invention, the amplitude of the analog potential to be sampled is continuously compared with a variable reference voltage representing the digital count in a counter. The difference voltage is then utilized to vary the count of the counter, and thereby the reference voltage, in single discrete steps until the reference voltage and the analog potential are substantially equal. Once this condition is reached, the counter continuously follows the variations of the analog potential, and readings are available at extremely short access times.

More particularly, the present invention discloses an electronic analog-to-digital converter comprising a digital counter, means for varying the count in the counter in accordance with the amplitude of the analog potential, and means for transmitting the contents of the counter. In one embodiment, the means for varying the count includes a source of clock pulses, a pair of gates for applying the pulses to the counter so that the counter counts up and down, respectively, and a circuit for selectively actuating the gates. The actuating circuit compares the amplitude of the analog potential with the amplitude of the analog equivalent of the count recorded in the counter at any instant. If the analog equivalent is equal to or less than the amplitude of the analog potential, one of the gates is actuated, while the other gate remains unactuated. The actuated gate is arranged to apply a clock pulse to the counter so that the counter counts up one digit in the least significant place. On the other hand, if the analog equivalent is greater than the potential being sampled, the other gate is actuated and the counter counts down one digit.

The analog equivalent of the new count is then compared with the analog potential and the count of the counter is again altered by one digit in the least significant place. This process continues until the analog equivalent is equal to the analog potential. At this point an equilibrium condition has been attained, and, if the analog potential remained constant, the count of the counter would alternate about a number representing the magnitude of the analog potential. On the other hand, if the analog potential varies, the count of the counter will continuously follow the variations.

In another embodiment, the clock pulses are applied directly to the counter which is provided with clamping circuits for automatically controlling the counter to count up or count down. The clamping circuits are responsive to the output signal from the actuating circuit so as to enable the counter to count in the proper direction.

It is, therefore, an object of this invention to provide an analog-to-digital converter which continuously presents the digital information.

Another object is to provide an analog-to-digital converter in which readings are available at relatively short access times, as compared with prior art converters.

An additional object is to provide an analog-to-digital converter in which the upper frequency limit is independent of the accuracy desired.

A further object is to provide an analog-to-digital converter in which the analog potential is continuously compared with a variable reference voltage representing the count in a digital counter.

A still further object is to provide an analog-to-digit converter employing a counter for counting up and counting down, the count in the counter being varied in discrete steps in accordance with the magnitude of the analog potential to be measured.

Still another object of the invention is to provide an analog-to-digital converter employing a counter for counting up and counting down, the count in the counter being varied in accordance with the difference between the analog potential and a reference voltage proportional to the count in the counter.

An additional object is to provide an analog-to-digital converter which compares the magnitude of the analog potential to be measured with the magnitude of a reference potential representing the count of a digital counter and either increases or decreases the count of the counter, depending upon the result of the comparison.

Another object is to provide an analog-to-digital converter employing a digital counter, and means for increasing the count of the counter when the analog potential to be measured is greater than the analog equivalent of the count of the counter, and for decreasing the count of the counter whenever the analog potential is less than the analog equivalent of the count of the counter.

The novel features which are believed to be characteristic of the invention, both as to its organization and method of operation, together with further objects and advantages thereof, will be better understood from the following description considered in connection with the accompanying drawings in which two embodiments of the invention are illustrated by way of examples. It is to be expressly understood, however, that the drawings are for the purpose of illustration and description only, and are not intended as a definition of the limits of the invention.

Figure 1:
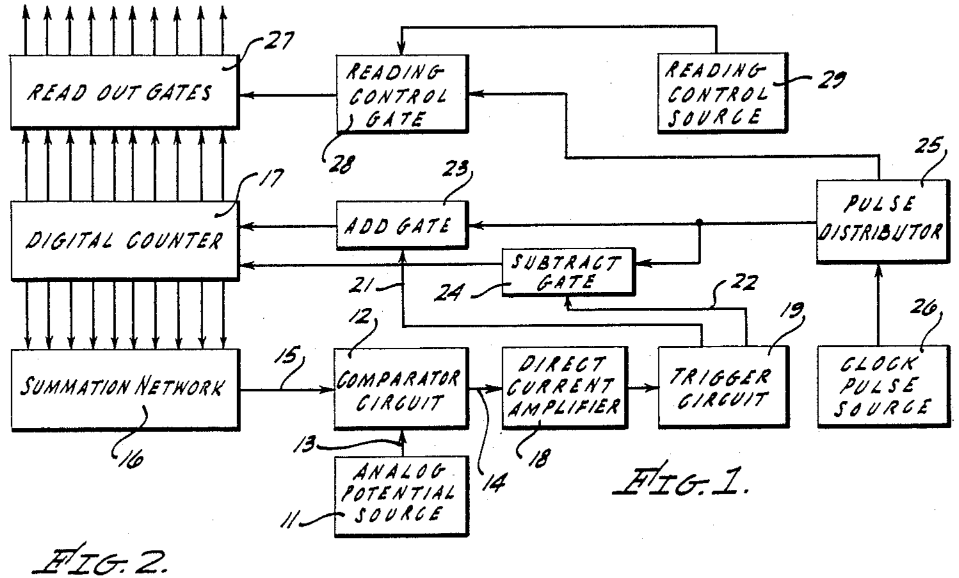
Fig. 1 is a block diagram of one embodiment of the analog-to-digital converter of this invention.

Referring now to the drawings, there is shown in Fig. 1 a block diagram of an analog-to-digital converter, according to the present invention, for converting analog information into digital form. The converter of Fig. 1 receives the analog information in the form of a variable direct-current potential applied from any suitable source 11. The analog potential is applied to one input terminal of a comparator circuit 12 through an input conductor 13. Circuit 12 is arranged to produce an output signal on an output conductor 14 which is proportional to the difference between the signal applied to the other input terminal thereof, through another input conductor 15, and the analog potential from source 11. One suitable form of circuit 12 is that illustrated in Fig. 9.45 at page 361 of vol. 19 of the M. I. T. Radiation Laboratory Series, entitled "Waveforms" published in 1949 by McGraw-Hill Book Company, Inc.

Conductor 15 is connected to the output terminal of a summation network 16 which has a plurality of input terminals connected to the plurality of output terminals of a digital counter 17. Network 16 is arranged to sum the weighted values appearing at the output terminals of counter 17 and to produce an output signal proportional to the numerical value of the count in counter 17. One suitable form of network 16 is a ladder adder of the type shown in U. S. patent application, Serial No. 239,077 for "Digital-to-Analog Converter" by Siegfried Hansen, filed July 28, 1951, now Patent 2,718,634 issued September 20, 1955.

Figure 3:
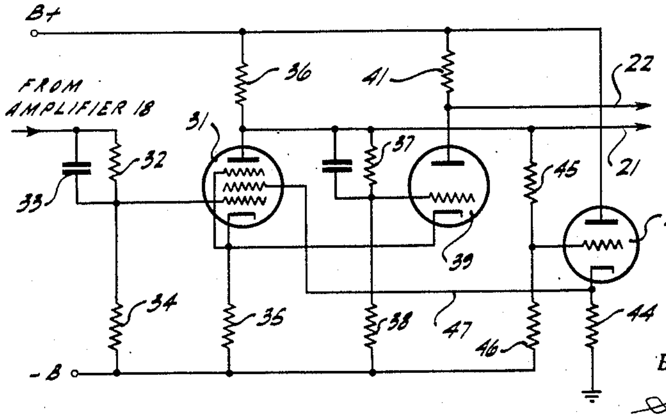
Fig. 3 is a schematic diagram of one form of the triggering circuit of Fig. 1.

The output of circuit 12 is applied through conductor 14 to a direct-current amplifier 18 whose output is applied to the input terminal of a trigger circuit 19. Circuit 19 is arranged to produce an output signal on output conductor 21 whenever the voltage on conductor 15 is equal to or less than the analog voltage appearing on conductor 13, and to apply an output signal to another output conductor 22 whenever the voltage on conductor 15 exceeds the voltage on conductor 13. The sensitivity of circuit 19 is adjusted to less than the minimum incremental change of the voltage appearing on conductor 15, that is circuit 19 should operate in response to changes in the output level of the signal from amplifier 18 which are less than the potential equivalent to the least significant digit of counter 17. One suitable form of circuit 19 is shown in Fig. 3 and will be described in detail below.

Conductor 21 is connected to the control terminal of an "add" gate 23 which has its output terminal connected to one input terminal of counter 17. Conductor 22 is connected to the control terminal of a "subtract" gate 24 which has its output terminal connected to another input terminal of counter 17. The input terminals of gates 23 and 24 are connected to one output terminal of a pulse distributor 25 which has its input terminal connected to the output terminal of a clock pulse source 26. The repetition frequency of source 26 determines the access time of the converter, and is limited by the carry and setting time of counter 17, that is the time required for counter 17 to reach equilibrium after application of a counting pulse thereto.

In operation, the signal applied through conductor 15 is compared in circuit 12 with the signal applied through conductor 13, and the difference between the two signals is amplified by amplifier 18 and applied to trigger circuit 19. If the voltage applied to circuit 19 is positive, that is the voltage on conductor 15 is greater than the voltage on conductor 13, a gating signal is applied from circuit 19 to gate 24 to open gate 24. Accordingly, the pulse from source 26 passes through gate 24 to one input terminal of counter 17. Counter 17 is a digital counter which is arranged to count up if pulses are applied to one input terminal thereof, namely through gate 23, and to count down if pulses are applied to the other input terminal thereof, namely through gate 24. One form of up-down counter for use in the circuit of Fig. 1 is that illustrated in Figs. 4 and 5 on pages 963 and 964 of "Electrical Engineering," November 1949, in an article entitled "The binary quantizer" by Kay Barney. In this counter, up or forward counting is produced by an incoming positive pulse, while down or backward counting is produced by an incoming negative pulse. Accordingly, it is merely necessary to invert the pulses from either gate 23 or gate 24, depending upon the type of pulses from distributor 25. Obviously, many conventional circuits will perform the conversion function, one such circuit being a common amplifier. In this manner, when gate 24 is open, the pulses from source 26 will operate counter 17 to count down one increment in the least significant digit of the counter. On the other hand, if gate 23 is open, the pulses from source 26 will actuate counter 17 to count up one increment from the least significant digit.

Circuit 12 continuously compares the voltage on conductor 15 with the voltage on conductor 13, and when these voltages are substantially equal, a signal will appear on conductor 21. Accordingly, gate 23 will be opened and counter 17 will count up. The voltage appearing on conductor 15, will, therefore, be greater than the voltage on conductor 13, and trigger circuit 19 will apply a signal to gate 24. In other words, when equilibrium conditions are reached, counter 17 will alternately count up and down one increment in the least significant digit, the count in counter 17, during this interval, being the equivalent of the analog voltage from source 11.

In order to permit continuous reading of the count in counter 17, the outputs appearing at all stages of counter 17 are applied to the input terminals, respectively, of a plurality of read out gates 27. Gates 27 are controlled simultaneously by the signal appearing at the output terminal of a reading control gate 28 which has its input terminal connected to the other output terminal of pulse distributor 25. The control terminal of gate 28 is connected to the output terminal of a reading control source 29 which applies a signal to gate 28 whenever a reading is desired. Source 29 may be any conventional direct-current potential source controlled by either a manually or an automatically operable switch. In order to assure that a reading does not occur during the interval when the counter is in the process of changing count, the signal applied from distributor 25 to gate 28 is time delayed with respect to the signals applied by distributor 25 to gates 23 and 24, the time delay corresponding to the carry and settling time of the counter. In practice, distributor 25 may include a direct connection between source 26 and gates 23 and 24, and a conventional delay line between source 26 and gate 28.

As pointed out below and shown in Fig. 2, the count of counter 17 changes one digit in the least significant place for each pulse from distributor 25. In this manner, the trigger circuit need only have two stable states of operation, one for actuating counter 17 to count up, and the other for actuating counter 17 to count down. Accordingly, it may be desirable, in some instances, to read all but the least significant digit of the count, in order to eliminate the additional digit produced when the analog potential from network 16 is equal to the analog potential from source 11. This result may be attained by omitting the connection between the least significant stage of counter 17 and gates 27.

It is thus seen that the present invention provides an analog-to-digital converter in which the digital information is continuously available at very short access times. In the converter of this invention, the access time is independent of the accuracy desired and is dependent upon the period of clock pulse source 26 which, in turn, is dependent upon the time required for counter 17 to change from one value to another. In practice, the carry and settling time of a counter arranged to count up and to count down is of the order of one microsecond, and, therefore, readings may be had every microsecond in the converter of this invention.

Figure 2:
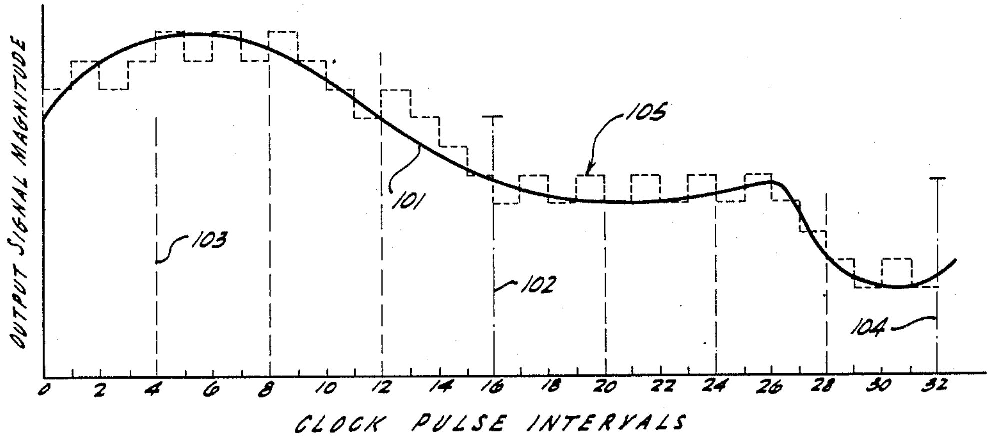
Fig. 2 is a composite diagram of waveforms illustrating the operation of the converter of Fig. 1, as compared with prior art converters.

Refering now to Fig. 2, there is shown a graph illustrating the operation of the converter of this invention as compared with the prior art converters. In Fig. 2, it is assumed that the clock pulse intervals of the various converters are identical, and that each of the converters has attained equilibrium at the beginning of the first interval. The solid curve 101 represents the analog signal to be converted and is chosen arbitrarily.

The vertical dot-dashed lines, such as line 102, represent the output of the counting converter of the prior art, while the vertical dashed lines, such as line 103, represent the output of the prior art subtraction converter. It will be recalled that, in both prior art converters, a reading not available until the end of a comparison interval which is an integral multiple of the period of the clock pulse source. In Fig. 2, it is assumed that the count is represented by four binary digits in each converter. Accordingly, in the counting converter, the first reading is available at the end of the sixteenth clock pulse interval, as indicated by line 102, while, in the subtraction converter, the first reading is available at the end of the fourth clock pulse interval, as indicated by line 103.

In the counting converter, only two readings are produced during the entire period illustrated in Fig. 2, these readings being indicated by line 102 and by a line 104 at the end of the thirty-second clock pulse interval. In addition, the readings are not continuous but occur in discrete steps sixteen clock pulse intervals apart. For example, the height of line 102 represents the magnitude of curve 101 at the beginning of the first clock pulse interval in Fig. 2, while the height of line 104 represents the magnitude of curve 101 at the end of the sixteenth clock pulse interval.

If the number of binary digits representing the count were increased to five, it is obvious that the period between successive readings of the counting converter would be increased to thirty-two clock pulse intervals. In addition, since the readings are obtained at widely separated intervals, as shown in Fig. 2, the counting converter cannot follow closely the variations of the analog potential, as indicated by curve 101 in Fig. 2. Accordingly, it is seen that the counting converter of the prior art does not produce continuous readings, has a relatively long access time, and has relatively low accuracy.

The subtracting converter of the prior art has a considerably reduced access time as compared with the counting converter. As shown in Fig. 2, the subtraction converter will produce eight readings within the thirty-two interval period. Since a larger number of readings are obtained, this converter will follow curve 101 more closely and will produce more accurate readings. However, the interval between readings in the subtraction converter is directly proportional to the number of places in the digital count, and the readings are not continuous. In addition, the subtraction converter requires highly accurate comparison circuits for producing the remainder voltages.

The readings of the converter of this invention are indicated by the dashed line generally designated 105 in Fig. 2. As shown in Fig. 2, the readings are substantially continuous and follow curve 101 very closely. Since trigger circuit 19 continuously applies a signal to one of gates 23 and 24, each pulse from source 26 is applied to counter 17 to change the count thereof. Accordingly, as shown in Fig. 2, line 105 changes once per clock pulse interval, the change being one digit in the least significant place in counter 17. Readings are obtained from read out gates 27 shortly after the beginning of each clock pulse interval, owing to the delay incorporated in distributor 25.

Although line 105 does not follow the rapid changes of curve 101 too closely, it should be apparent that this difficulty may be eliminated by increasing the frequency of the clock pulses from source 26. In addition, greater accuracy can be obtained with the converter of this invention by increasing the number of stages of counter 17. It should be noted that, in distinction to the prior art converters, the access time of the converter of this invention does not necessarily increase with an increase in the number of stages of the counter. As stated above, the period of the clock pulses, and therefore the access time, is determined by the carry and settling time of counter 17, which may vary only slightly with an increase in the number of stages of counter 17. On the other hand, in both prior art converters, the access time is a multiple of the clock pulse period, the multiple being proportional to the number of stages of the counter.

Referring now to Fig. 3, there is shown one form of trigger circuit for use in the converter of Fig. 1. In Fig.

3, trigger circuit 19 comprises a multi-grid vacuum tube, such as a pentode 31 having its control grid connected to the output terminal of amplifier 18 through a parallel combination of a resistor 32 and a capacitor 33. The control grid of tube 31 also is connected to the —B terminal of a source of direct-current potential, not shown, through a resistor 34, the other terminal of the source being grounded. Resistors 32 and 34 constitute a voltage divider between the output terminal of amplifier 18 and the —B terminal, the values of resistors 32 and 34 being so chosen as to maintain tube 31 substantially at cutoff when the output of amplifier 18 is zero. In other words, when the analog equivalent of the count from counter 17 is equal to the analog potential from source 11, tube 31 is cut off. When the analog equivalent is less than the analog potential, tube 31 remains cut off, while tube 31 is rendered conducting when the analog equivalent exceeds the analog potential. The cathode of tube 31 is connected to the —B terminal through a cathode load resistor 35, while a plate load resistor 36 connects the plate of tube 31 to the +B terminal of another source of direct-current potential, not shown, the other terminal of this source being grounded. The plate of tube 31 is connected to conductor 21.

A voltage divider, including a pair of resistors 37 and 38, is connected between the plate of tube 31 and the —B terminal, the common junction of resistors 37 and 38 being connected to the control grid of a vacuum tube, such as a triode 39. The plate of triode 39 is connected to the +B terminal through a plate load resistor 41, while the cathode of triode 39 is connected through resistor 35 to the —B terminal. Resistor 35 constitutes common cathode loading for both tube 31 and triode 39.

In operation, with tube 31 cut off, the grid bias on triode 39 is determined by the current flow through resistors 36, 37, and 38. The values of these resistors are so chosen that, under these conditions, the grid of triode 39 is positive with respect to the cathode and triode 39 is conducting heavily. Accordingly, the voltage at the plate of triode 39, or at conductor 22, is well below +B owing to the voltage drop across resistor 41. For example, if the voltage at the +B terminal is assumed to be 250 volts, the voltage at conductor 22, during conduction of triode 39, may be 100 volts.

Now, if the voltage applied to the grid of tube 31 rises, tube 31 is driven above cutoff and starts to conduct. Conduction of tube 31 produces a voltage drop across resistor 36 which lowers the voltage at the grid of triode 39. Therefore, triode 39 becomes less conducting, and the voltage drop across common cathode load resistor decreases. The decrease in voltage across resistor 35 further elevates the voltage at the grid of tube 31 and renders tube 31 more heavily conducting which further decreases the conduction of triode 39. It is thus seen that the cathode coupling between tube 31 and triode 39 constitutes a regenerative coupling, the cumulative effect of which is to render tube 31 heavily conducting and to cut off triode 39. Under these conditions, the voltage at conductor 22 rises to a value substantially equal to that of the voltage at the +B terminal.

If, now, the voltage applied to the grid of tube 31 falls, tube 31 will conduct less and drive triode 39 into conduction. The regenerative coupling will eventually cut off tube 31 and drive triode 39 into heavy conduction, as in the initially assumed state. It is thus seen that tube 31 and triode 39 constitute a regenerative triggering circuit in response to variations in the level of the voltage appearing at the output end of amplifier 18. In the illustrated embodiment, it is assumed that the circuit parameters are so chosen that the voltage at conductor 22 is at its high voltage level, and therefore actuates gate 24, when the difference signal from circuit 12 exceeds zero, and that the voltage at conductor 21 is at its high voltage level, and therefore actuates gate 23, when the difference signal is equal to or less than zero. It should be clear, however, that the circuit of Fig. 1 would operate satisfactorily if the voltage at conductor 22 were at its high voltage level when the difference signal was equal to zero. In this instance, the counter would count down one digit, instead of counting up, as shown in Fig. 2.

In order to speed up the action of the triggering circuit, a cathode follower 43 is provided, cathode follower 43 having its plate connected directly to the +B terminal, and its cathode connected to ground through a load resistor 44. The grid of cathode follower 43 is connected to the common junction of a pair of serially connected resistors 45 and 46 which constitute a voltage divider connected between the plate of tube 31 and the —B terminal. The cathode of cathode follower 43 is directly connected to the screen of tube 31 through a lead 47.

In operation, with tube 31 cut off, cathode follower 43 conducts heavily, and the screen of tube 31 is held at a relatively high positive level. Accordingly, tube 31 will respond rapidly to any signal tending to drive tube 31 into conduction. On the other hand, with tube 31 conducting heavily, cathode follower 43 is cut off, and the secreen of tube 31 is held at a relatively low positive level. Under these conditions, tube 31 will respond rapidly to any signal tending to cut off tube 31.

In Fig. 1, the voltage levels from trigger circuit 19 are utilized to control actuation of gates 23 and 24, and the pulses from distributor 25 are applied to counter 17 through these gates. By properly arranging counter 17, each pulse from distributor 25 may be applied directly to a single input terminal of the counter, with trigger circuit 19 directly controlling the counter. Three stages of a binary digital counter of this type, together with their input connections, are shown in Fig. 4.

Figure 4:
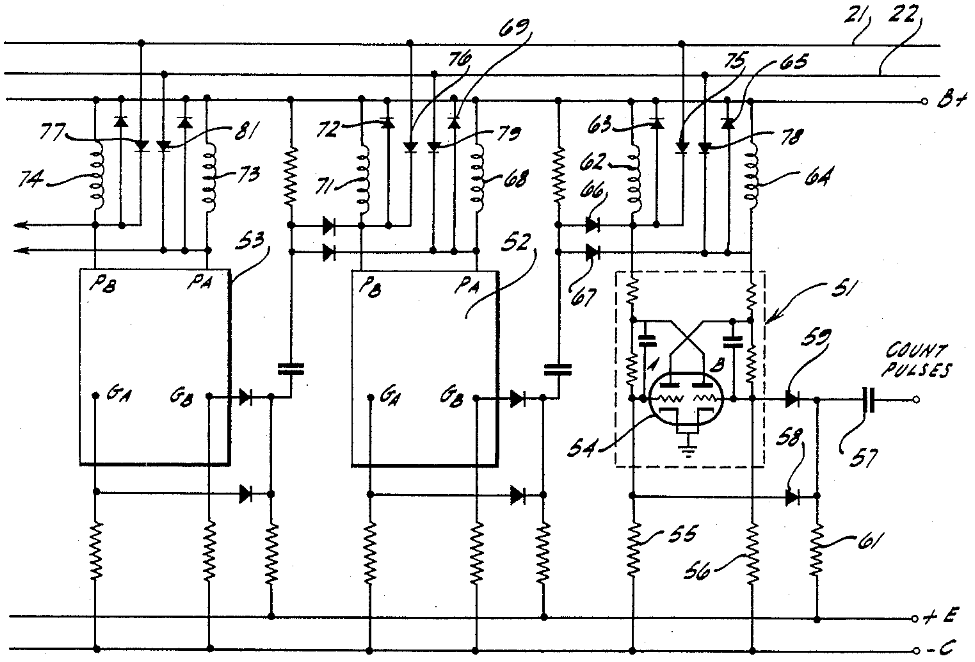
Fig. 4 is a schematic diagram of a digital counter for use in a modified arrangement of the converter of Fig. 1.

The counter of Fig. 4 includes a least significant or units stage 51, a twos stage 52, and a fours stage 53, all of stages 51, 52, and 53 being identical. Stage 51 is preferably a conventional bistable multivibrator or flip-flop circuit including a twin triode 54 having a left-hand or A section and a right-hand or B section. The grids of the A and B sections of triode 54 are connected through resistors 55 and 56, respectively, to the —C terminal of a source of direct-current potential, not shown, the other terminal of the source being grounded. Both grids receive the count pulses from distributor 25 through a coupling capacitor 57 and diodes 58 and 59. Capacitor 57 is connected through a resistor 61 to the +E terminal of a source of direct-current potential, not shown, the other terminal of this source being grounded. The magnitude of the voltage at the +E terminal is so chosen as to prevent inadvertent triggering of triode 54 owing to noise pulses, but to permit the pulses from distributor 25 to trigger triode 54.

The plate of the B section of triode 54 is connected through a plate load resistor to one end of a unidirectional ringing circuit including a peaking inductor 62 connected in parallel to a damping diode 63. The other end of the unidirectional ringing circuit is connected to the +B terminal of a source of direct-current potential, not shown, the other terminal of the source being grounded. Similarly, the plate of the A section of triode 54 is connected to a unidirectional ringing circuit including a peaking inductor 64 connected in parallel to a damping diode 65.

In operation, if the voltage at the plate of either section drops sharply, owing to the triggering of the section from a non-conducting state to a conducting state, a ringing or damped oscillatory signal is produced at the lower end of the associated peaking coil, the initial portion of this signal being negative. The diode serves to short out the positive portion of this signal, and therefore all other portions, and the result produced is a sharp negative pulse. This negative pulse is coupled either through a diode 66 or a diode 67 to the grids of stage 52. On the other hand, if the voltage at the plate of either section of triode 54 increases sharply, the resulting signal across the associated peaking coil is shorted out by the diode. It is thus seen that stage 51 will apply a triggering pulse to stage 52 whenever the voltage at one of the plates of triode 54 drops sharply.

Stages 52 and 53 are identical with stage 51, as set forth above. Accordingly, stages 52 and 53 are shown in block form in Fig. 4 with the plate and grid connections of each stage being designated P and G, respectively within the block. As shown, a peaking circuit, including a coil 68 and a diode 69, is connected to the plate of the A section of stage 52, while the plate of the B section of stage 52 is connected to a peaking circuit, including a coil 71 and a diode 72. The peaking circuits of stage 53, including coils 73 and 74, are connected to the grids of the next stage, not shown, of the counter.

It has been noted that, in the counter of Fig. 4 which has been described thus far, each stage will trigger the next higher stage whenever one of its sections changes from a nonconducting state to a conducting state. The remaining connections of the counter of Fig. 4 constitute a clamping circuit which insures that the stages are triggered automatically so as to count up or count down, depending upon the state of trigger circuit 19.

In Fig. 4, conductor 21, the output conductor from tube 31, is connected to coils 62, 71, and 74 through a plurality of diodes 75, 76, and 77, respectively, the anodes of each of diodes 75, 76, and 77 being connected to conductor 21. Conductor 22, the output conductor of triode 39, is connected to coils 64, 68, and 73 through a plurality of diodes 78, 79, and 81, respectively, the anodes of diodes 78, 79, and 81 being connected to conductor 22. As set forth above, conductor 21 is at its high voltage level, substantially the voltage at the +B terminal, when counter 17 is to count up. At the same time, conductor 22 is at its low voltage level, a voltage substantially less than that at the +B terminal. It will be shown that, under these conditions, the counter of Fig. 4 will count up one digit for each count pulse.

Assume that initially each stage of the counter has its A section conducting and its B section cut off, and that this condition represents the binary number 0 in each stage. The first count pulse will trigger stage 51 rendering its B section conducting and cutting off its A section. Since the A section switched from its conducting state to its non-conducting state, no triggering pulse will be produced by coil 64. On the other hand, coil 62 will produce a negative pulse owing to the switching of the B section. However, with conductor 21 substantially at the voltage of the +B terminal, diode 75 will clamp the voltage at coil 62 at this level and squelch the negative pulse. Accordingly, stage 52, and all succeeding stages will not be triggered, and the three stages of the counter will indicate the binary number 001.

The next count pulse will trigger stage 51 rendering the A section conducting and cutting off the B section. Since the A section of stage 51 switched from a nonconducting state to a conducting state, coil 64 will produce a negative pulse. Now, with conductor 22 at its low voltage level, diode 78 will not squelch the negative pulse from coil 64, and this pulse will be applied through diode 67 to stage 52 thereby triggering stage 52. Therefore, the A section of stage 52 will be cut off, while the B section will be rendered conducting. From the explanation above, it is apparent that this triggering of stage 52 will cause coil 71 to produce a negative pulse, and that this negative pulse will be squelched by diode 76. Accordingly, no further triggering of the stages of the counter will occur, and the three stages of the counter will indicate the binary number 010. It is, therefore, apparent that, with conductors 21 and 22 at the voltage levels stated, the counter of Fig. 4 will count up one digit for each pulse from distributor 25.

Assume, now, that the counter is to count down, and that the voltage levels on conductors 21 and 22 have been reversed. Under these conditions, conductor 22 is at its high voltage level and the diodes associated with conductor 22 will squelch the triggering pulses. On the other hand, conductor 21 is at its low voltage level, and diodes 75, 76, and 77 will not squelch the triggering pulses.

The next count pulse will trigger stage 51, rendering the B section conducting and cutting off the A section. Coil 62 will, therefore, produce a triggering pulse which will be applied through diode 66 to trigger stage 52. The A section of stage 52 will conduct, while the B section will cut off. The pulse produced by coil 68 will be squelched by diode 79, and stage 53 will not be triggered. Accordingly, the three stages of the counter will indicate the binary number 001. Thus, with conductor 21 at its low voltage level and conductor 22 at its high voltage level, the counter of Fig. 4 will count down one digit for each pulse from distributor 25.

It should be noted that, in the counter of Fig. 4, an ambiguity may arise if a count pulse is received at the counter at substantially the same time that the difference voltage applied to trigger circuit 19 is changed from a positive value to a negative value or from a negative value to a positive value. Under these conditions, the voltages at conductors 21 and 22 may not reach their equilibrium levels at the time the count pulse is applied and the blocking diodes may not be effective. Accordingly, the count pulse may have no effect, or may have an effect opposite to that desired, upon all but the first stage of the counter.

Figure 5:
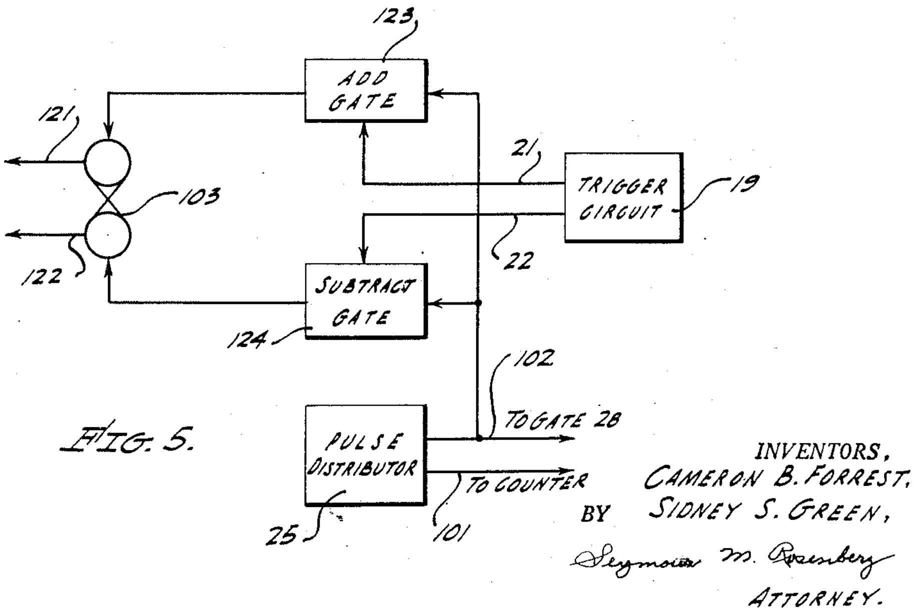
Fig. 5 is a schematic diagram of a modified control circuit for the counter of Fig. 4.

Referring now to Fig. 5, there is shown a schematic diagram of an arrangement for controlling the counter of Fig. 4 which eliminates the possibility of the ambiguity set forth above. In Fig. 5, pulse distributor 25 has a pair of output conductors 101 and 102 connected to the counter and to read control gate 28, respectively, conductor 102 receiving the delayed pulses from the distributor. Conductor 102 is also connected to the input terminals of an "add" gate 123 and a "subtract" gate 124, respectively, gates 123 and 124 being similar to gates 23 and 24 of Fig. 1. As in Fig. 1, the control terminals of gates 123 and 124 are connected to output conductors 21 and 22, respectively, of trigger circuit 19. However, in Fig. 5, the output terminals of gates 123 and 124 are connected to the input terminals, respectively, of a flip-flop circuit 103 having corresponding output conductors 121 and 122. Conductors 121 and 122 of flip-flop 103 constitute the input conductors for the counter of Fig. 4.

In operation, the voltage levels appearing on conductors 21 and 22 of trigger circuit 19 determine the operation of gates 123 and 124, as in Fig. 1. Each delayed pulse appearing on conductor 102 is then applied through the open gate to control the state of conduction of flip-flop circuit 103. For example, if gate 123 is open, the delayed pulse will trigger flip-flop circuit 103 so that the potential appearing on conductor 121 is at its high voltage level and the potential appearing on conductor 122 is at its low voltage level. Accordingly, the voltage levels appearing on conductors 121 and 122 correspond to, but are delayed one clock pulse interval from, the voltage levels appearing on conductors 21 and 22, respectively. Stated differently, since the count of the counter of Fig. 4 is changed each time a count pulse is applied, the arrangement of Fig. 5 will produce the same count changes as those set forth in connection with the description of Fig. 2, except that each change is now delayed one clock pulse interval from the corresponding change resulting without the arrangement of Fig. 5.

With the arrangement of Fig. 5, the count in the counter is changed by a count pulse at a time when the voltage levels on conductors 121 and 122 are stabilized and cannot be affected by a change occurring simultaneously in the difference voltage applied to trigger circuit 19. Accordingly, there is no possibility of any inadvertent or erroneous changes in the count, as pointed out above. However, since each count change with the arrangement of Fig. 5 is determined by the difference voltage during the preceding clock pulse interval, it should be apparent that the readings obtained will be delayed one clock pulse interval, as compared with the readings shown in Fig. 2. It is also apparent that the arrangement of Fig. 5 may be substituted for the gating arrangement shown in Fig. 1 in order to remove any possibility of ambiguity in the readings of the circuit of Fig. 1.

What is claimed as new is:

1. An electronic analog-to-digital converter responsive to applied count pulses for continuously converting the instantaneous amplitude of a variable electrical signal into digital form, said converter comprising: an electronic digit counting circuit operable to count up or count down in response to the applied count pulses; an electrical summation network electrically coupled to said counting circuit for continuously converting the digital count in said counting circuit into an electrical analog signal of an amplitude equivalent to the digital count; first means electrically coupled to said network for combining said electrical analog signal with the variable electrical signal to produce a first output signal having one of two levels according to the sense of the difference between the amplitudes of the combined signals; second means for periodically sampling the instantaneous level of said first output signal prior to the application of each of the count pulses to said counting circuit to produce a corresponding second output signal; third means responsive to said second output signal for producing, during each sampling period, a third output signal having a level corresponding to the sampled level of said first output signal; and fourth means electrically coupled between said third means and said counting circuit and responsive to said third output signal for rendering said counting circuit operable to count in a direction determined by the corresponding sampled level of said first output signal.

2. The converter defined in claim 1 wherein said second means includes an electrical gating circuit, and pulse distributor means coupled to said gating circuit for actuating said gating circuit to apply the sampled level of said first output signal to said third means.

3. The converter defined in claim 2 wherein said third means includes a flip-flop circuit coupled to said electrical gating circuit, said flip-flop circuit being responsive to the sampled signal applied through said electrical gating circuit for producing said third output signal.

4. An electrical analog-to-digital converter for continuously converting the instantaneous amplitude of a variable electrical signal into an equivalent digital form, said converter comprising: an electrical pulse counting circuit operable to count up or count down; a source of periodic pulses; first means electrically coupled between said source and said counting circuit for applying said pulses to said counting circuit, said first means being actuable to operate said counting circuit to count up; second means for applying said pulses to said counting circuit, said second means being actuable to operate said counting circuit to count down; an electrical network electrically coupled to said counting circuit for continuously converting the count in said counting circuit into an electrical analog signal of equivalent amplitude; an electrical comparison circuit electrically coupled to said network for combining said analog signal with the variable electrical signal to produce an electrical output signal having first and second levels, respectively, when the amplitude of said analog signal is greater and less than the amplitude of said variable electrical signal; third means electrically coupled to said comparison circuit for periodically sampling the instantaneous level of said output signal prior to the application of each of said pulses to said counting circuit and producing a corresponding stored signal during the period between samples; and fourth means electrically coupled between said third means and said first and second means for selectively actuating said first and second means, respectively, in response to said stored signal.

5. The converter defined in claim 4 wherein said converter further includes read-out gating means coupled to said counting circuit and operable in response to applied read-out control signals for producing digital output signals corresponding to the digital count of said counting circuit; and means for applying read-out control signals to said gating means at a predetermined time interval after the application of each of said counting pulses to said counter.

6. An electrical analog-to-digital converter for converting the amplitude of an analog input signal into equivalent digital form, said converter comprising: an electrical pulse counting circuit operable to count up or to count down; first means electrically coupled to said counting circuit for periodically applying pulses to said counting circuit to vary the count in said counting circuit; second means electrically coupled to said counting circuit for rendering said counting circuit operable to count down; third means electrically coupled to said counting circuit for rendering said counting circuit operable to count up; an electrical network electrically coupled to said counting circuit for producing an electrical reference signal having an amplitude equivalent to the count in said counting circuit; fourth means responsive to said reference signal and to the analog input signal for producing a first output signal when the amplitude of said reference signal exceeds the amplitude of said analog input signal and for producing a second output signal when the amplitude of said reference signal is less than the amplitude of said analog input signal; fifth means, coupled to said fourth means for periodically sampling the instantaneous amplitudes of said first and second output signals prior to the application of each of the pulses to the counting circuit to produce corresponding first and second sample signals during the period between samplings; and sixth means coupled to said fifth means and responsive to said first and second sample signals for actuating said second and third means, respectively.

7. In an electrical analog-to-digital converter responsive to applied count pulses for converting the amplitude of an analog input signal into an equivalent set of digital signals by comparing the amplitude of the analog input signal with the amplitude of a reference signal corresponding to the digital number in a counter, the counter being operable to count up or count down in response to the applied count pulses to reduce the difference between the analog input signal and the reference signal, the combination comprising: first means responsive to the reference signal and to the analog input signal for producing a first output signal having one of two levels according to the sense of the difference between the amplitudes of the combined signals; second means for periodically sampling the instantaneous level of said first output signal prior to the application of each of the count pulses to said counting circuit to produce a corresponding second output signal; third means responsive to said second output signal for producing, during each sampling period, a third output signal having a level corresponding to the sampled level of said first output signal; and fourth means electrically coupled between said third means and said counting circuit and responsive to said third output signal for rendering said counting circuit operable to count in a direction determined by the corresponding sampled level of said first output signal.

References Cited in the file of this patent

UNITED STATES PATENTS

| | | |
|---|---|---|
| 2,462,275 | Morton | Feb. 22, 1949 |
| 2,486,390 | Cunningham | Nov. 1, 1949 |

(Other references on following page)

UNITED STATES PATENTS

| | | |
|---|---|---|
| 2,505,029 | Carbrey | Apr. 25, 1950 |
| 2,537,427 | Seid | Jan. 9, 1951 |
| 2,539,623 | Heising | Jan. 30, 1951 |
| 2,583,102 | Holden | Jan. 22, 1952 |
| 2,611,085 | Masson | Sept. 16, 1952 |
| 2,715,724 | Oberman et al. | Aug. 16, 1955 |
| 2,717,994 | Dickinson et al. | Sept. 13, 1955 |
| 2,735,005 | Steele | Feb. 14, 1956 |

FOREIGN PATENTS

| | | |
|---|---|---|
| 975,941 | France | Oct. 17, 1950 |